(12) United States Patent
Shoup

(10) Patent No.: US 11,488,106 B1
(45) Date of Patent: Nov. 1, 2022

(54) SUPPLY CHAIN MANAGEMENT SYSTEM AND METHOD

(71) Applicant: West Pak Avocado, LLC, Dallas, TX (US)

(72) Inventor: Heath Shoup, Murrieta, CA (US)

(73) Assignee: West Pak Avocado, LLC, Dallas, TX (US)

(*) Notice: Subject to any disclaimer, the term of this patent is extended or adjusted under 35 U.S.C. 154(b) by 0 days.

(21) Appl. No.: 17/748,925

(22) Filed: May 19, 2022

(51) Int. Cl.
*G06Q 10/00* (2012.01)
*G06Q 10/08* (2012.01)
*G06K 7/10* (2006.01)
*G06Q 30/02* (2012.01)

(52) U.S. Cl.
CPC ....... *G06Q 10/087* (2013.01); *G06K 7/10861* (2013.01); *G06Q 30/0206* (2013.01)

(58) Field of Classification Search
CPC ............. G06K 7/10861; G06Q 10/087; G06Q 30/0206
See application file for complete search history.

(56) References Cited

U.S. PATENT DOCUMENTS

| | | | | |
|---|---|---|---|---|
| 2005/0170324 | A1* | 8/2005 | Yu | G09B 3/02 434/331 |
| 2005/0178314 | A1* | 8/2005 | McGuire | G01K 1/02 374/E1.002 |
| 2006/0127581 | A1* | 6/2006 | Aspens | D06P 5/001 427/282 |
| 2007/0138295 | A1* | 6/2007 | White | G09F 3/0291 235/491 |
| 2007/0162350 | A1* | 7/2007 | Friedman | G06F 16/9554 705/346 |
| 2007/0256792 | A1* | 11/2007 | Reading | G01K 11/12 374/E1.019 |
| 2010/0012018 | A1* | 1/2010 | Ribi | G01K 3/04 252/182.13 |
| 2016/0194132 | A1* | 7/2016 | Davidson | B07C 5/3422 206/459.1 |
| 2018/0136052 | A1* | 5/2018 | Nemet | G01K 3/04 |
| 2020/0193252 | A1* | 6/2020 | Guinard | G06K 19/145 |

* cited by examiner

Primary Examiner — Thien M Le
(74) Attorney, Agent, or Firm — Procopio Cory Hargreaves and Savitch LLP

(57) ABSTRACT

A supply chain management system is provided that includes a label having a first side with an adhesive and a second side with a plurality of information units printed thereon. The plurality of information units are printed in visible ink or invisible ink and the invisible ink is activated by environmental conditions such as temperature or light spectrum. The label is affixed to an object being processed and the visible appearance of one or more information elements originally printed in invisible ink is used for further processing or the object.

13 Claims, 14 Drawing Sheets

SUPPLY CHAIN MANAGEMENT SYSTEM AND METHOD

BACKGROUND

Field of the Invention

The present disclosure generally relates to management of products in the supply chain and more specifically relates to product labels and/or mediums applied to perishable products in the supply chain that dynamically change to convey product specific information as the perishable products navigate their way through the supply chain.

Related Art

Commercial products navigate their way through the supply chain from source to destination in a variety of states of completion. For perishable products in particular, the time/age sensitivity of the product is critical as the product makes its way from source to destination. Companies that own an inventory of perishable products in the supply chain face serious challenges to manage their production to sales forecasts as the products are subject to spoilage and improper handling. Companies that own an inventory of perishable products in the supply chain face additional challenges related to the delivery of custom processed products because custom processing of perishable products eliminates such custom processed perishable products from redeployment to other potential customers, for example if the initial customer cancels an order for the custom processed perishable products. Therefore, what is needed is a system and method that overcomes these significant problems found in conventional supply chain management as described above.

SUMMARY

Accordingly, described herein are supply chain management systems and methods that facilitates the management of perishable objects as they navigate their way through the supply chain.

In an aspect, a supply chain management system includes a label having a first side and a second side, where the first side is configured to affix the label to an object and the second side includes a plurality of information elements. The plurality of information elements include at least one first information element in a first ink that is visible and at least one second information element in a second ink that is configured to be activated by environmental conditions.

In an aspect, a supply chain management method includes obtaining a label having a first side and a second side, the first side configured to affix the label to a first object. The method also includes printing a plurality of information elements on the second side of the label and affixing the label to the first object. The plurality of information elements include at least one first information element in a first ink that is visible and at least one second information element in a second ink that is configured to be activated by environmental conditions.

In an aspect, a supply chain management method includes affixing a first label to a first perishable product at a first waypoint in a supply chain, the first label having at least one first information element in a visible ink and at least one second information element in an invisible ink. The method also includes analyzing the first label on the first perishable product at a second waypoint in the supply chain to identify at least one second information element on the first label that has been activated by environmental conditions to become visible. The method also includes removing the first perishable product from the supply chain in response to identifying the at least one second information element on the first label that has been activated by environmental conditions to become visible.

In an aspect, a supply chain management method includes affixing a label to a perishable object, the label comprising a plurality of information elements including at least one first information element in a first ink that is visible and at least one second information element in a second ink that is invisible until activated by environmental conditions. The method also includes processing the perishable object to apply a coating to at least a portion of the surface of the perishable object and further processing the perishable object to expose the label to an ultraviolet light having a wavelength configured to activate the second ink and turn the at least one second information element visible. In this method, the at least one second information element is an indicator that the protective coating has been applied to the perishable object.

In an aspect, a supply chain management method includes, at a first waypoint in a supply chain, receiving a first perishable product having a first label affixed to a surface of the first perishable product, the first label having at least one first information element in a visible ink and at least one second information element in a first invisible ink and at least one third information element in a second invisible ink. The first invisible ink and the second invisible ink are configured to be activated by environmental conditions to become visible. The method also includes, at a second waypoint in the supply chain, applying a coating to at least a portion of the surface of the first perishable object and also at the second waypoint in the supply chain, exposing the first label to an ultraviolet light having a wavelength configured to activate the first invisible ink to become visible, where the second information element is an indicator that the protective coating has been applied to the first perishable object. The method also includes, at a third waypoint in the supply chain, analyzing the first label on the first perishable product to identify at least one third information element on the first label where the invisible ink has been activated by environmental conditions to become visible, and also at the third waypoint in the supply chain, in response to identifying the at least one third information element on the first label where the invisible ink has been activated by environmental conditions to become visible, rerouting the first perishable object through the supply chain for a newly identified purpose.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Disclosed herein are systems and methods for supply chain management. For example, one method disclosed herein allows for a label to be applied to an object in the supply chain. The label includes one or more information elements printed in one or more inks that dynamically change in response to environmental conditions. The objects with the labels in the supply chain are processed at one or more waypoints of the supply chain to activate the one or more inks or to analyze the labels and process the objects in accordance with the presence, absence, and/or appearance of the information elements at the waypoints.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
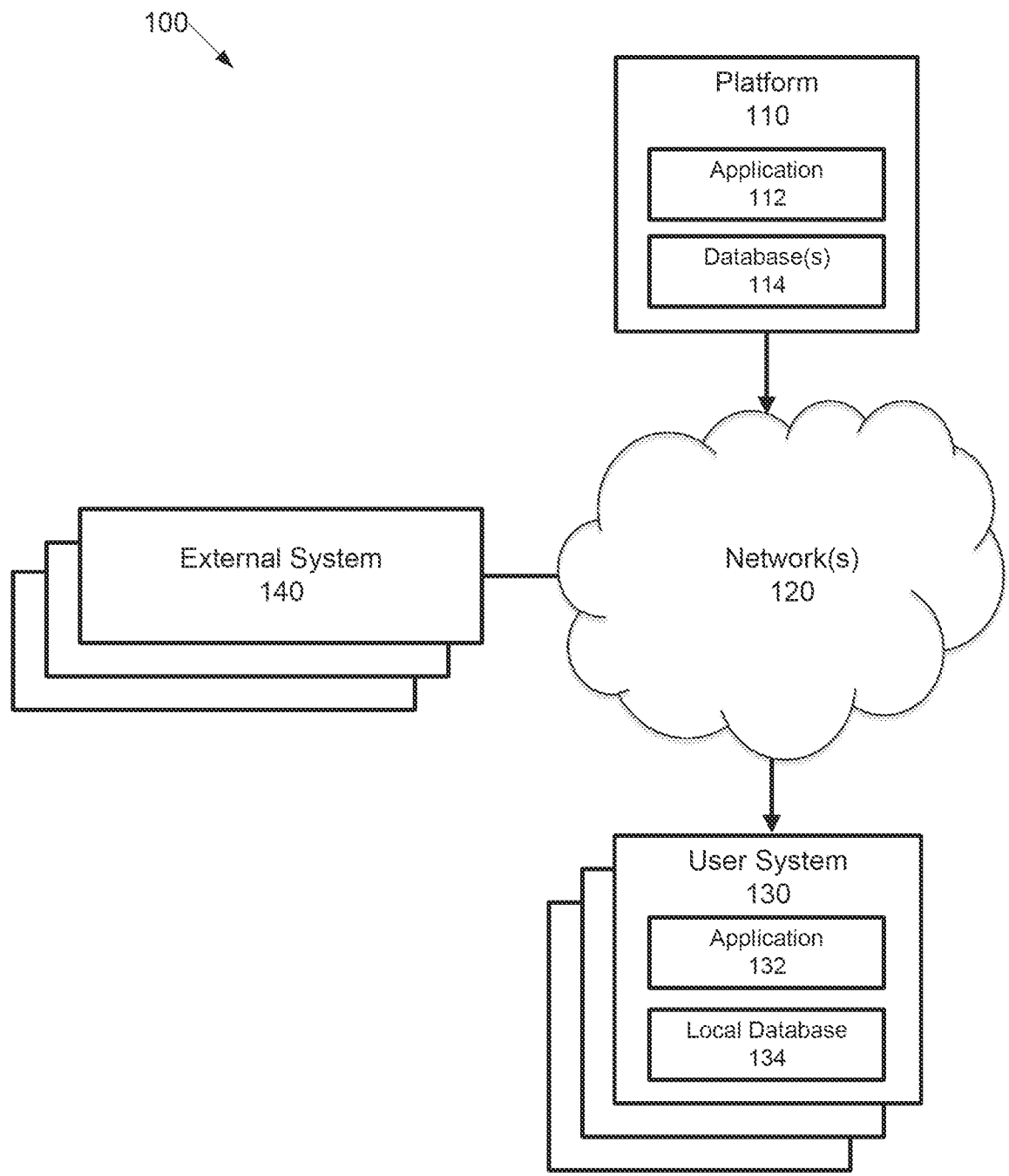
FIG. 1 illustrates an example supply chain management infrastructure, in which one or more of the processes described herein, may be implemented, according to an aspect.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein, for example, a supply chain management system. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120, for example a user systems 130 at one or more waystations in the supply chain. Platform 110 may also be communicatively connected to one or more external systems 140 (e.g., other platforms, websites, waystations in the supply chain, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, server computers, desktop computers, laptop computers, tablet computers, smart phones or other mobile phones, image scanners, infra-red scanners, bar code scanners, machine vision scanners, color scanners, infrared scanners, other scanners, light wands, ultraviolet light wands, illumination systems, conveyer systems, food processing systems, ten key devices, head mounted displays, game consoles, set-top boxes, video terminals, televisions, electronic kiosks, point-of-sale terminals, printers, ink jet printers, ink jet sprayers, print plates, Automated Teller Machines, and/or the like.

Platform 110 may comprise web servers which host one or more websites and/or web services. For example, a web service could be a supply chain management system that operates on remote servers via the network 120 and allows access by one or more user systems 130 and external systems 140 to manage products making their way through the supply chain. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114 for implementing a supply chain management system. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™ Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application described herein.

Figure 2:
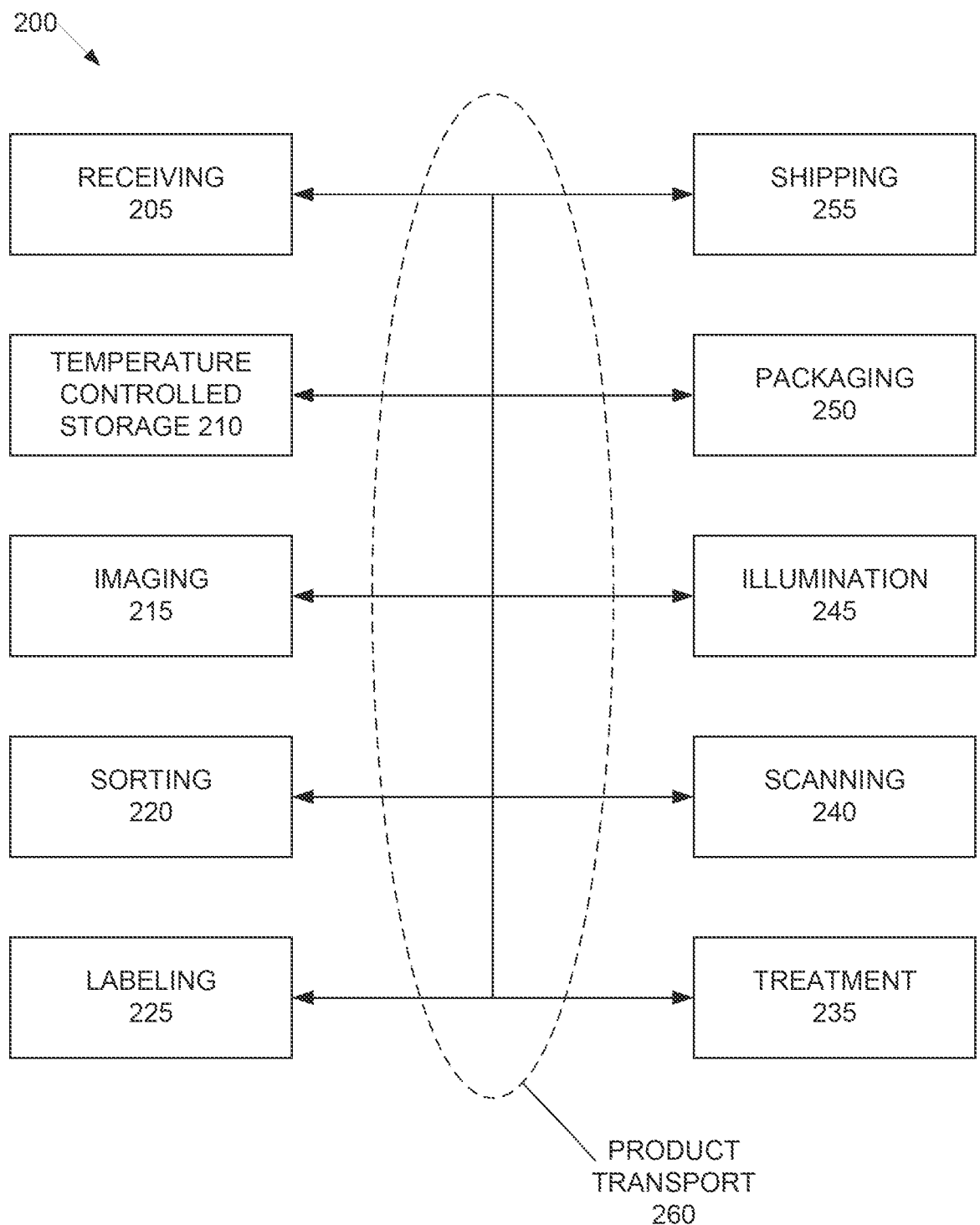
FIG. 2 illustrates an example processing system, with which at least a portion of one or more of the processes described herein, may be executed, according to an aspect.

FIG. 2 illustrates an example processing system 200, with which at least a portion of one or more of the processes described herein, may be executed, according to an aspect. In one aspect, the system 200 may be implemented in a large processing plant with large ingress/egress openings for moving large amounts of product through the processing plant. The processing system 200 may have multiple waypoints connected by a product transport system 260. In an aspect, the product transport system 260 comprises at least in part a conveyor system that automatically moves product to different waypoints in a predetermined order or in a dynamically determined order. Additionally, as the product moves through the processing system 200, it may be processed by each of the waypoints in any order, or it may be processed by less than all of the waypoints in any order, and in either scenario (all waypoints or less than all waypoints) the product may visit some waypoints more than once.

In the illustrated aspect, the various waypoints include a receiving station 205, temperature controlled storage station 210, imaging station 215, sorting station 220, labeling station 225, treatment station 235, scanning station 240, illumination station 245, packaging station 250 and shipping station 255.

The receiving station 205 is configured to facilitate ingress of product and may include one or more vehicle bays and one or more storage areas. Similarly, the shipping station 255 is configured to facilitate egress of product and may include one or more vehicle bays and one or more storage areas. In one aspect, the receiving station 205 and the shipping station 255 may be combined. When the product is received, it may have a label applied to each individual piece or the product may be unlabeled.

Temperature controlled storage station 210 is configured to maintain the product at a desirable temperature, for example between 38 degrees Fahrenheit and 41 degrees Fahrenheit. In one aspect, when the product is initially placed into the temperature controlled storage station 210, the contiguous cold chain analysis begins. The cold chain analysis is designed to monitor the environment of the product to identify any breaks in the cold chain. A break in the cold chain is identified when the ambient environment of the product exceeds a predetermined temperature for a predetermined amount of time. For example, if the ambient environment temperature exceeds 55 degrees Fahrenheit for more than 45 minutes.

The imaging station 215 is configured to capture one or more images of each piece of product. In one aspect, the imaging station 215 is configured to capture multiple images of each piece of product to approximate a 360 degree view of each individual piece of product. Such images are then analyzed to determine the quality of the individual piece of product so that unsuitable individual pieces may be rejected. In one aspect, two or more digital images of an individual piece of product are captured to approximate a 360 degree view of the individual piece of product and the two or more digital images are analyzed by a programmed module trained to identify defects in the product and products with defects that exceed a predetermined threshold are rejected.

The sorting station 220 is configured to sort the individual pieces of the product. In one aspect the individual pieces of product are sorted by weight. Alternatively, individual pieces may be sorted by size or by a combination of weight and size. In one aspect the imaging station 215 and sorting station 220 may be combined.

The labeling station 225 is configured to apply a label to each individual piece of product. In one aspect, only individual pieces of product that were unlabeled when received by the receiving station 205 and were not rejected by the imaging station 215 and that were sorted by the sorting station 220 are processed by the labeling station 225. The labeling station 225 may apply a pre-printed label to each individual piece of product. The pre-printed label may include a plurality of different types of ink. A first type of ink is a durable visible ink, which may be of a variety of different colors. A second type of ink is a changeable ink that is activated by certain environmental conditions. A changeable ink may be visible or invisible and the environmental conditions may, for example, activate the changeable ink to make it visible or activate the changeable ink to change it from a first color to a second color.

In an aspect, the changeable ink may be configured to change only one time, for example from invisible to visible. Alternatively, the changeable ink may be configured to change multiple times, for example from invisible to visible and from a first color to a second color. The changeable ink may also be configured to change a first time (e.g., from invisible to visible) and then reverse that change (e.g., from visible to invisible). Additionally, the changeable ink also be configured to deactivate so that it can no longer change, regardless of the environmental conditions. For example the changeable ink may be configured to change color or become visible in accordance with predetermined environmental conditions (e.g., when the ambient temperature exceeds a predetermined threshold for a predetermined period of time) and the changeable ink may also be configured to become fixed in its current state (e.g., current color, visible, or invisible). For example, the changeable ink may be illuminated with a certain wavelength of light that causes the changeable ink to no longer be changeable.

The treatment station 235 is configured to treat the product. In one aspect, treating the product comprises applying a coating to the surface of the product. For example, the coating may be a protective coating. For example, one type of protective coating may be an ethylene inhibitor.

The scanning station 240 is configured to scan the product and determine a size of the product. The scanning station 240 is also configured to sort the product by size so it can be delivered, for example, to the packaging station to be packaged up by size.

The illumination station 245 is configured to flood the product with one or more wavelengths of light in order to activate one or more inks of the labels applied to individual pieces of product. In an aspect, the illumination station 245 is configured to flood the product with an ultraviolet light to activate an ink on the labels applied to individual pieces of product.

The packaging station 250 is configured to assemble individual pieces of product into appropriate packaging to allow the product to be shipped to its next destination.

Figure 3:
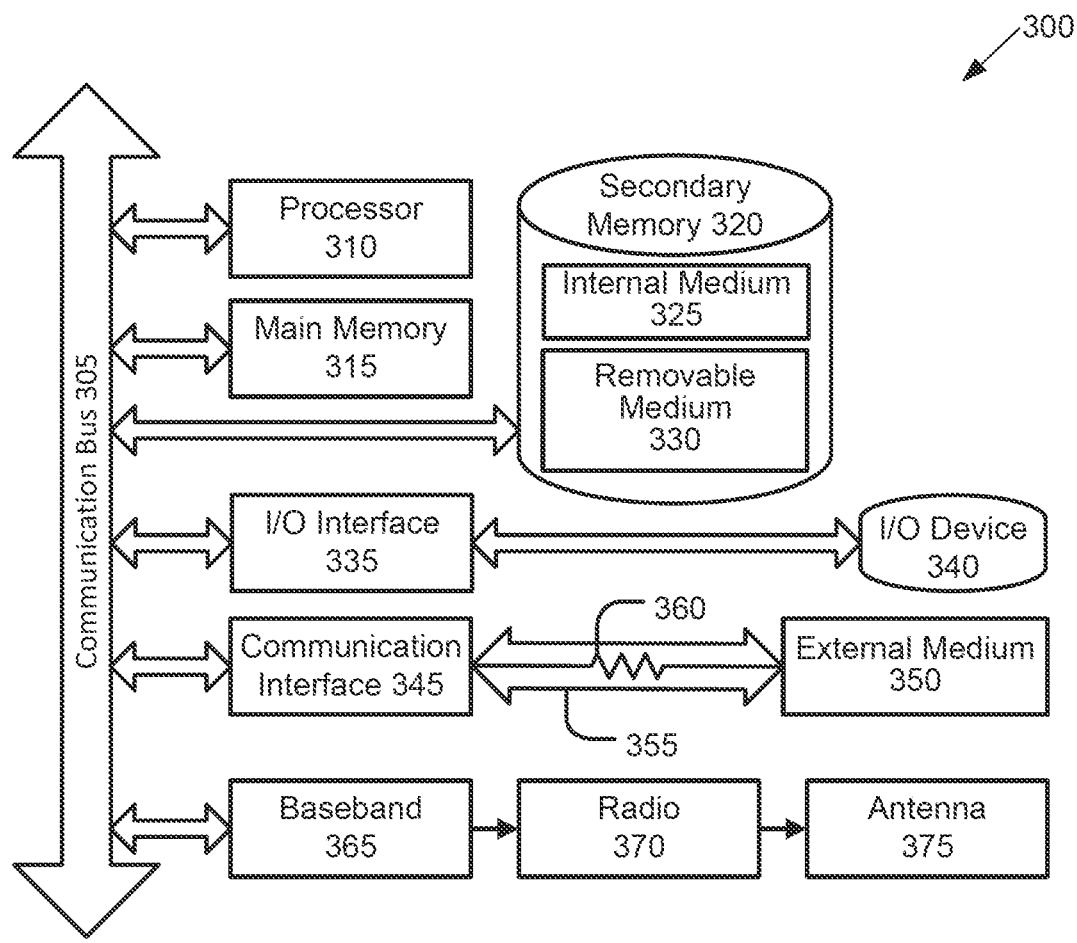
FIG. 3 illustrates an example computer processing system, by which at least a portion of one or more of the processes described herein, may be executed, according to an aspect.

FIG. 3 is a block diagram illustrating an example wired or wireless system 300 that may be used in connection with various embodiments described herein. For example, system 300 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 300 can be a server or any conventional personal computer, or any other processor-enabled device that is capable of wired or wireless data communication. Other computer systems and/or architectures may be also used, as will be clear to those skilled in the art.

System 300 preferably includes one or more processors, such as processor 310. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 310. Examples of processors which may be used with system 300 include, without limitation, the Pentium® processor, Core i7® processor, and Xeon® processor, all of which are available from Intel Corporation of Santa Clara, Calif.

Processor 310 is preferably connected to a communication bus 305. Communication bus 305 may include a data channel for facilitating information transfer between storage and other peripheral components of system 300. Furthermore, communication bus 305 may provide a set of signals used for communication with processor 310, including a data bus, address bus, and/or control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 300 preferably includes a main memory 315 and may also include a secondary memory 320. Main memory 315 provides storage of instructions and data for programs executing on processor 310, such as one or more of the functions and/or modules discussed herein. It should be understood that programs stored in the memory and executed by processor 310 may be written and/or compiled according to any suitable language, including without limitation C/C++, Java, JavaScript, Perl, PHP Framework, Visual Basic, .NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 320 may optionally include an internal medium 325 and/or a removable medium 330. Removable medium 330 is read from and/or written to in any well-known manner. Removable storage medium 330 may be, for example, a magnetic tape drive, a compact disc (CD)

drive, a digital versatile disc (DVD) drive, other optical drive, a flash memory drive, and/or the like.

Secondary memory 320 is a non-transitory computer-readable medium having computer-executable code (e.g., disclosed software modules) and/or other data stored thereon. The computer software or data stored on secondary memory 320 is read into main memory 315 for execution by processor 310.

In alternative embodiments, secondary memory 320 may include other similar means for allowing computer programs or other data or instructions to be loaded into system 300. Such means may include, for example, a communication interface 345, which allows software and data to be transferred from external storage medium 350 to system 300. Examples of external storage medium 350 may include an external hard disk drive, an external optical drive, an external magneto-optical drive, and/or the like. Other examples of secondary memory 320 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 300 may include a communication interface 345. Communication interface 345 allows software and data to be transferred between system 300 and external devices (e.g. printers), networks, or other information sources. For example, computer software or executable code may be transferred to system 300 from a network server (e.g., platform 110) via communication interface 345. Examples of communication interface 345 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 300 with a network (e.g., network(s) 120) or another computing device. Communication interface 345 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 345 are generally in the form of electrical communication signals 360. These signals 360 may be provided to communication interface 345 via a communication channel 355. In an embodiment, communication channel 355 may be a wired or wireless network (e.g., network(s) 120), or any variety of other communication links. Communication channel 355 carries signals 360 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 315 and/or secondary memory 320. Computer programs can also be received via communication interface 345 and stored in main memory 315 and/or secondary memory 320. Such computer programs, when executed, enable system 300 to perform the various functions of the disclosed embodiments as described elsewhere herein.

In this description, the term "computer-readable medium" is used to refer to any non-transitory computer-readable storage media used to provide computer-executable code and/or other data to or within system 300. Examples of such media include main memory 315, secondary memory 320 (including internal memory 325, removable medium 330, and external storage medium 350), and any peripheral device communicatively coupled with communication interface 345 (including a network information server or other network device). These non-transitory computer-readable media are means for providing executable code, programming instructions, software, and/or other data to system 300.

In an embodiment that is implemented using software, the software may be stored on a computer-readable medium and loaded into system 300 by way of removable medium 330, I/O interface 335, or communication interface 345. In such an embodiment, the software is loaded into system 300 in the form of electrical communication signals 360. The software, when executed by processor 310, preferably causes processor 310 to perform one or more of the processes and functions described elsewhere herein.

In an embodiment, I/O interface 335 provides an interface between one or more components of system 300 and one or more input and/or output devices 340. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), head mounted displays (HMDs), and/or the like. In some cases, an input and output device 340 may be combined, such as in the case of a touch panel display (e.g., in a smartphone, tablet, or other mobile device).

In an embodiment, the I/O device 340 may be any type of external or integrated display and may include one or more discrete displays that in aggregate form the I/O device 340. The I/O device 340 may be capable of 2D or 3D presentation of visual information to a user of the system 300. In one embodiment, the I/O device 340 may be a virtual reality or augmented reality device in the form of HMD by the user so the user may visualize the presentation of information in 3D.

System 300 may also include optional wireless communication components that facilitate wireless communication over a voice network and/or a data network (e.g., in the case of user system 130). The wireless communication components comprise an antenna system 375, a radio system 370, and a baseband system 365. In system 300, radio frequency (RF) signals are transmitted and received over the air by antenna system 375 under the management of radio system 370.

In an embodiment, antenna system 375 may comprise one or more antennae and one or more multiplexors (not shown) that perform a switching function to provide antenna system 375 with transmit and receive signal paths. In the receive path, received RF signals can be coupled from a multiplexor to a low noise amplifier (not shown) that amplifies the received RF signal and sends the amplified signal to radio system 370.

In an alternative embodiment, radio system 370 may comprise one or more radios that are configured to communicate over various frequencies. In an embodiment, radio system 370 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 370 to baseband system 365.

If the received signal contains audio information, then baseband system 365 decodes the signal and converts it to an analog signal. Then the signal is amplified and sent to a speaker. Baseband system 365 also receives analog audio signals from a microphone. These analog audio signals are converted to digital signals and encoded by baseband system 365. Baseband system 365 also encodes the digital signals for transmission and generates a baseband transmit audio signal that is routed to the modulator portion of radio system 370. The modulator mixes the baseband transmit audio signal with an RF carrier signal, generating an RF transmit signal that is routed to antenna system 375 and may pass through a power amplifier (not shown). The power amplifier amplifies the RF transmit signal and routes it to antenna system 375, where the signal is switched to the antenna port for transmission.

Baseband system 365 is also communicatively coupled with processor 310, which may be a central processing unit (CPU). Processor 310 has access to data storage areas 315 and 320. Processor 310 is preferably configured to execute instructions (i.e., computer programs, such as the disclosed application, or software modules) that can be stored in main memory 315 or secondary memory 320. Computer programs can also be received from baseband processor 360 and stored in main memory 310 or in secondary memory 320, or executed upon receipt. Such computer programs, when executed, enable system 300 to perform the various functions of the disclosed embodiments.

Figure 4:
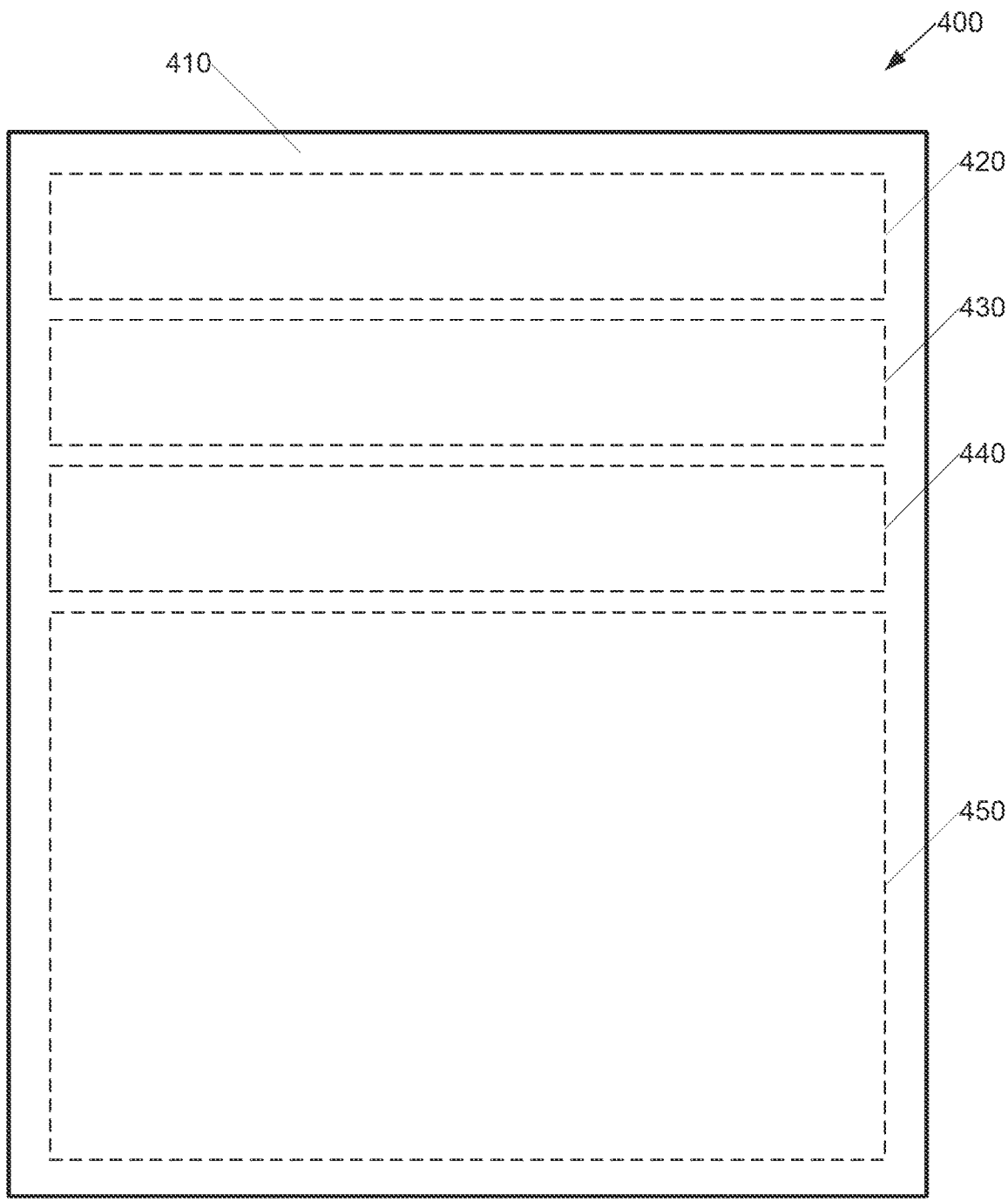
FIG. 4 illustrates an example label that can be applied to an object in a supply chain management system, according to an aspect.

FIG. 4 illustrates an example label 400 that can be applied to an object in a supply chain management system, according to one aspect. The label 400 may have an adhesive applied to one side to allow the label to be affixed to an object. The other side of the label 400 includes a field 410, which may have multiple subsections, and multiple information elements 420, 430, 440, and 450 that are positioned on the field 410. In the illustrated aspect, information elements 420, 430, 440, and 450 are all positioned on the field 410 of the label 400. In alternative aspects, there may be more or fewer information elements on the label 400 and they may be larger or smaller than illustrated in FIG. 1 and positioned in location different from the locations illustrated in FIG. 1. Each information element may convey different information that is helpful to the processing of the object upon which the label 400 is affixed.

The material used to form the label 400 may be polyester, polypropylene, paper, polyethylene, polyethylene terephthalate, or other natural substances, processed substances, or plastics may be originally white in color such that the field 410 is white prior to processing the label 400 to apply the field 410 and place the various information elements 420, 430, 440, and 450.

In one aspect, the field 410 and each information element 420, 430, 440, and 450 may be printed using a variety of different types of ink. A first type of ink is a durable visible ink in a variety of colors. A second type of ink is an ink that is activated by certain environmental conditions. For example, the ink may originally be invisible and become visible when appropriate environmental conditions are present. Alternatively, the ink may originally be a first color and become a second color when appropriate environmental conditions are present. Additional transitions from a first state of the ink to a second state of the ink are also envisioned.

One example of an appropriate environmental condition includes thermal activation where the invisible ink becomes visible at a certain temperature or changes color at a certain temperature. Another example of an appropriate environmental condition includes ultraviolet light activation where the invisible ink becomes visible when exposed to a certain wavelength of light, such as ultraviolet light at a wavelength of 254 nanometers. Another example of an appropriate environmental condition includes chemical activation where the invisible ink becomes visible when exposed to a certain chemical, such as an acidic or basic solution or an aerosol or solution having a specific chemical property. Additional examples of appropriate environmental conditions to activate the ink and transition the ink from a first state to a second state are also envisioned.

Figure 5:
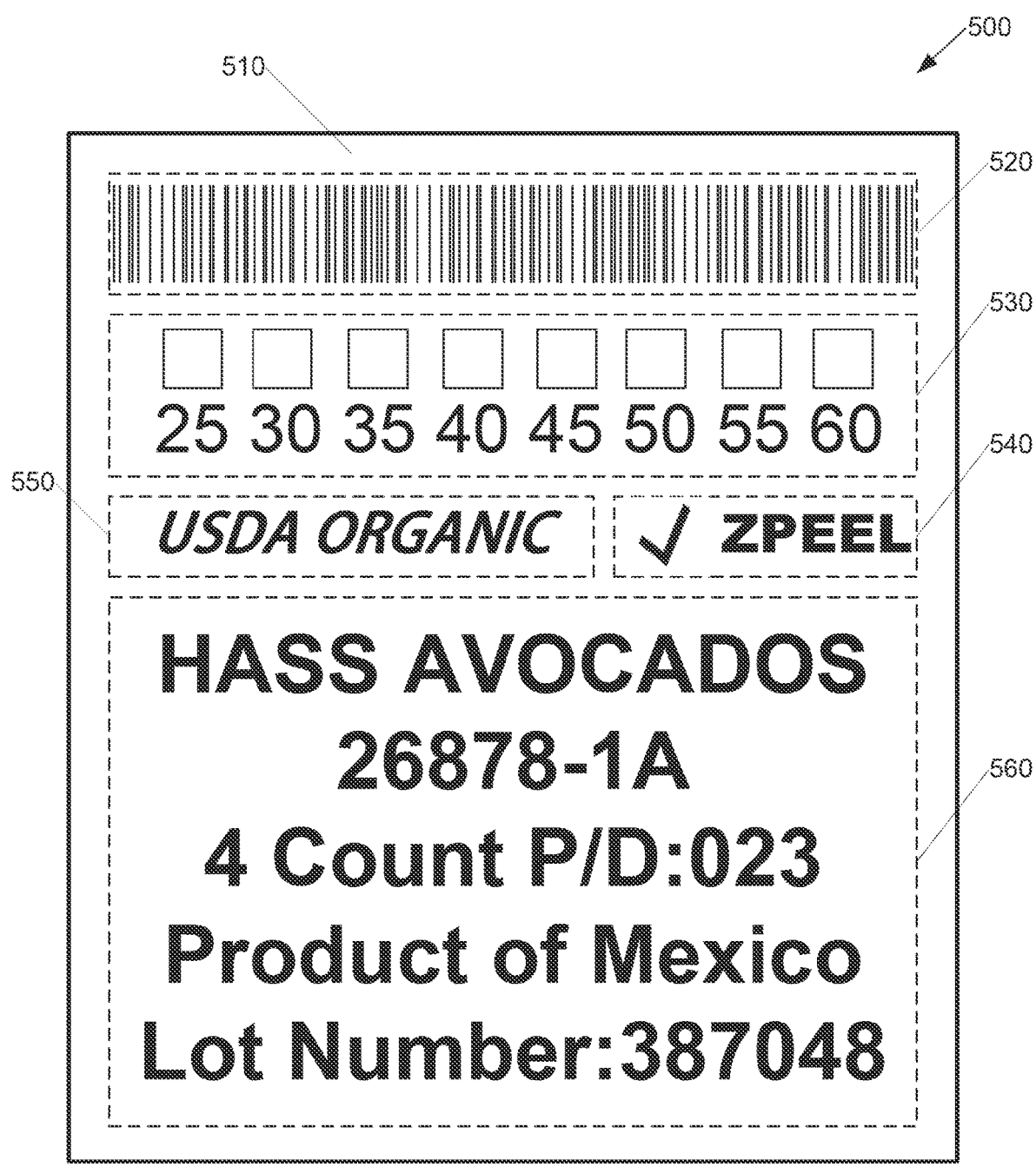
FIG. 5 illustrates an example label that can be applied to an object in a supply chain management system, according to an aspect.

FIG. 5 illustrates an example label 500 that can be applied to an object in a supply chain management system, according to one aspect. For example, the object the label 500 is applied to may be a perishable product such as an avocado. As shown, the label 500 has information elements 520, 530, 540, 550, and 560 positioned on the field 510. The field 510 is a neutral white color, information element 520 includes a barcode, information element 530 includes a temperature gauge, information element 540 includes a variable processing element, information 550 includes product specific information, and information element 560 includes a product description.

The neutral white color of the field 510 may be the color of material of the label 500 or may be the color of an ink applied to the field 510, or both. The barcode included in information element 520 can be printed in durable black ink or variable ink that changes color when activated. The barcode itself may be scanned by a user system at any waypoint along the supply chain to access information about the product to which the label 500 is affixed. The temperature gauge 530 may be printed in both durable ink and several different invisible inks to allow for variation in the visibility of ink filling up the boxes corresponding to different temperatures of the environment that the product was subjected to in the supply chain. The information element 540 may include an invisible ink brand corresponding to a specific brand of treatment applied to the product upon which the label is affixed. In one aspect, the product has the specific brand of treatment applied to it and then subsequently, after the label is affixed to the product, it is subjected to the appropriate environmental conditions to activate the invisible ink and cause the brand to become visible and convey, e.g., to a machine vision processing system, that the product has been so treated.

The information element 550 may include a variety of product specific information such as the geographic source of the product or a characteristic of the product and the information element 560 may include a variety of information about the product such as a product description. Additional information elements with various additional information may also be included on the label 500.

Figure 6:
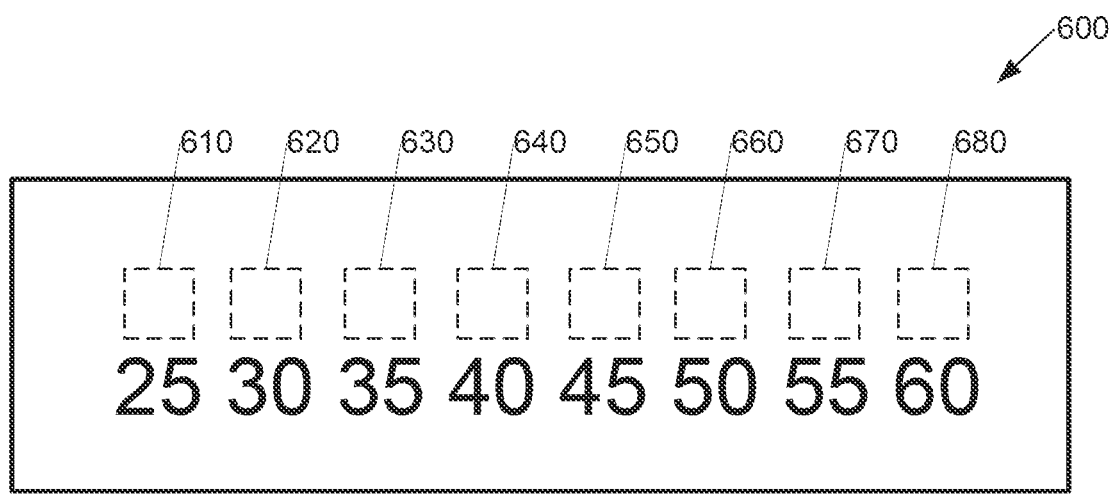
FIG. 6 illustrates an example portion of a label that can be applied to an object in a supply chain management system, according to an aspect.

FIG. 6 illustrates an example information element portion 430 of a label that can be applied to an object in a supply chain management system, according to an aspect. As shown, the information element portion 430 includes sub-portions 610, 620, 630, 640, 650, 660, 670, and 680. As will be understood, any information element may have a plurality of sub-portions and the sub-portions may in turn have a plurality of sub-sub-portions and so on. In the illustrated aspect, temperature values, e.g., in Fahrenheit, are printed in the information element 430, for example in durable black ink. The boxes that define sub-portions 610, 620, 630, 640, 650, 660, 670, and 680 are also printed in durable black ink. Inside each box, the respective sub-portion 610, 620, 630, 640, 650, 660, 670, and 680 is printed with one or more temperature activated invisible ink such that when the appropriate environment conditions are present (e.g., exceeding a particular temperature for a predetermined amount of time), the inside of the respective box defining the sub-portion 610, 620, 630, 640, 650, 660, 670, and 680 is wholly or partially filled in to convey, e.g., to a machine vision processing system, an approximation of the maximum temperature the product has been stored at within the supply chain. In one aspect, if the maximum temperature exceeds a predetermined threshold, e.g., 55 degrees Fahrenheit, the supply chain management system is configured to examine the supply chain history of the product to determine if the product should be removed from the supply chain.

Figure 7A:
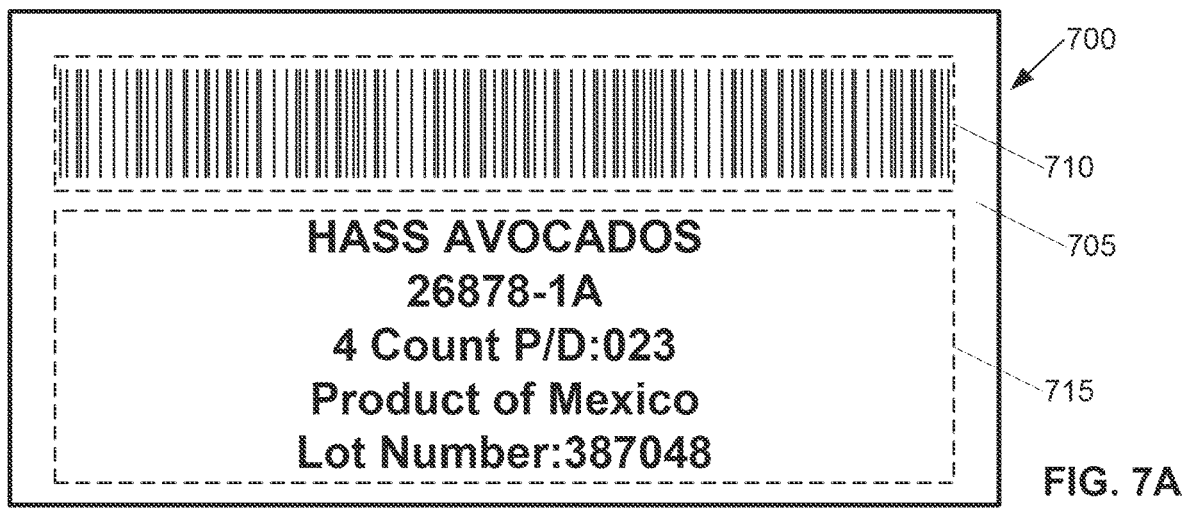
FIGS. 7A, 7B and 7C illustrate an example label in a supply chain management system dynamically changing in response to environmental conditions, according to an aspect.
Figure 7B:
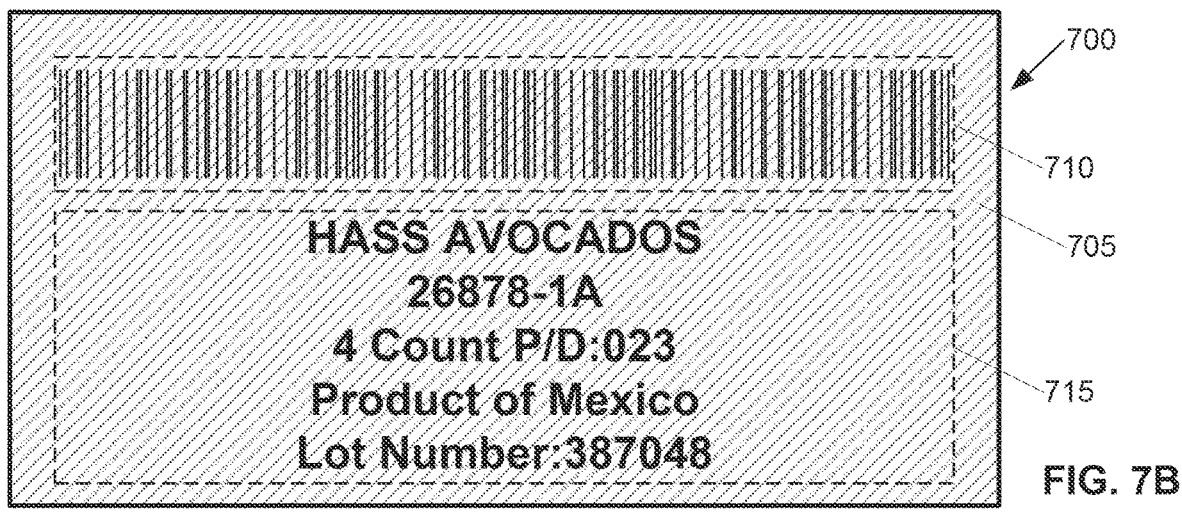
Figure 7C:
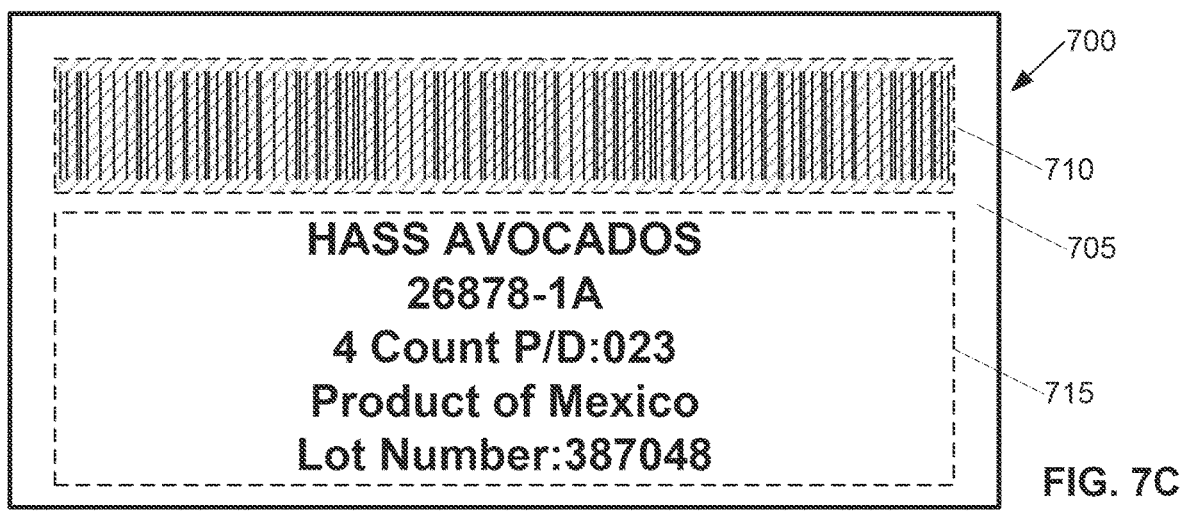

FIGS. 7A, 7B and 7C illustrate an example label 700 in a supply chain management system dynamically changing in response to environmental conditions, according to an aspect. As shown in FIG. 7A the label 700 includes information elements 710, and 715 positioned upon field 705. The field 705 is printed with a first invisible ink, but the first invisible ink has not been activated so the field 705 appears as a neutral white color. Information unit 710 includes a barcode printed in durable black ink and is also printed with a second invisible ink, but the second invisible ink has not been activated so the information element 710 appears to only include the barcode on a neutral white background. Information unit 715 includes a product description printed in durable black ink.

Turning to FIG. 7B, in this aspect, appropriate environmental conditions were present (e.g., a certain ambient temperature for a predetermined amount of time or the presence of an ultraviolet light for a predetermined amount of time) to activate the first invisible ink on the field 705 but not to activate the second invisible ink on the information unit 710. Accordingly, as shown in FIG. 7B, the entire field 705 has changed to a new color representing by the hashing. For example, the new color may be a light green or a light red color so that the durable black ink of the barcode in information unit 710 and the durable black ink of the product description in information unit 715 remain visible.

Turning to FIG. 7C, in this aspect, appropriate environmental conditions were present (e.g., a certain ambient temperature for a predetermined amount of time or the presence of an ultraviolet light for a predetermined amount of time) to activate the second invisible ink on the information unit 710 but not to activate the first invisible ink on the field 705. Accordingly, as shown in FIG. 7C, the entire information unit 710 has changed to a new color representing by the hashing. For example, the new color may be a light green or a light red color so that the durable black ink of the barcode in information unit 710 remains visible.

Figure 8A:
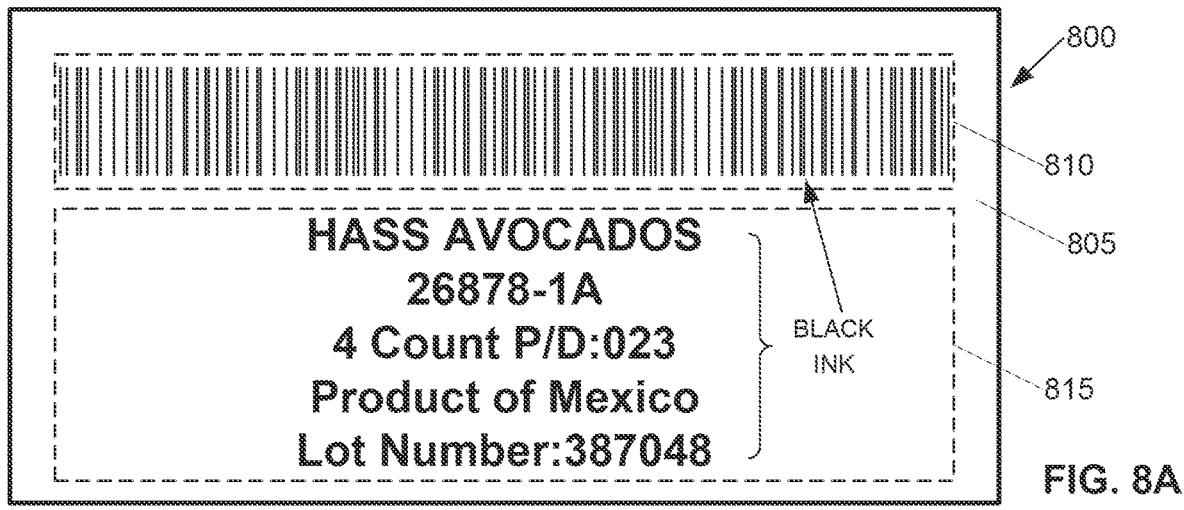
FIGS. 8A, 8B and 8C illustrate an example label in a supply chain management system dynamically changing in response to environmental conditions, according to an aspect.
Figure 8B:
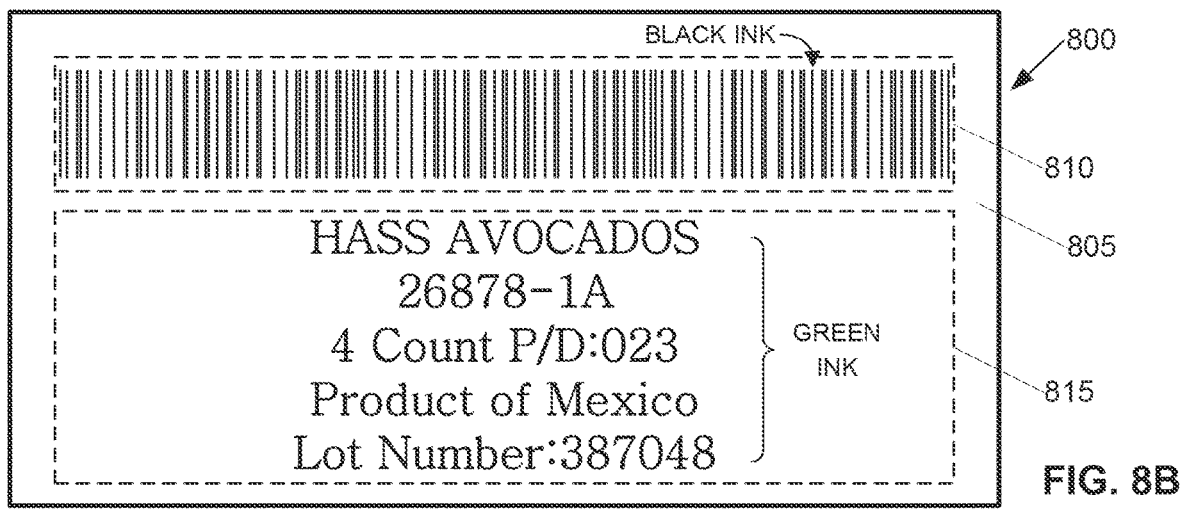
Figure 8C:
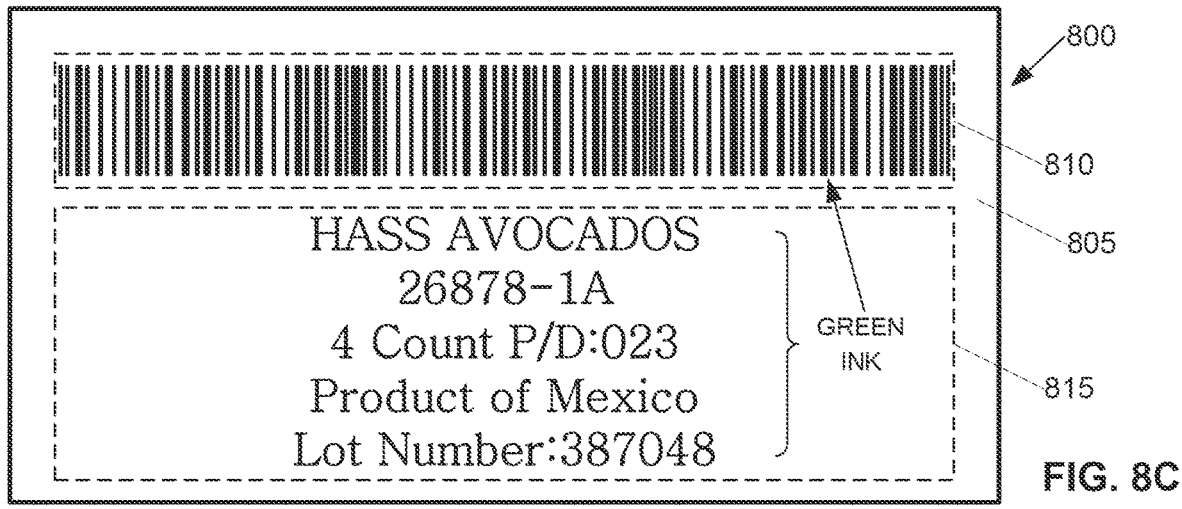

FIGS. 8A, 8B and 8C illustrate an example label 800 in a supply chain management system dynamically changing in response to environmental conditions, according to an aspect. As shown in FIG. 8A the label 800 includes information elements 810, and 815 positioned upon field 805. The barcode appearing in information unit 810 is printed with a first invisible ink, but the first invisible ink has not been activated so the barcode in the information unit 810 appears as a black color. Similarly, information unit 815 includes a product description printed with a second invisible ink, but the second invisible ink has not been activated so the product description in the information unit 815 appears as a black color.

Turning to FIG. 8B, in this aspect, appropriate environmental conditions were present for a sufficient amount of time to activate the second invisible ink in the information unit 815 but not to activate the first invisible ink in the information unit 810. Accordingly, as shown in FIG. 8B, the barcode in the information unit 810 remains in the black color while the product description in the information unit 815 has changed to a new color represented by the different font. For example, the new text color for the product description in information unit 815 may be a dark green color.

Turning to FIG. 8C, in this aspect, appropriate environmental conditions were present for a sufficient amount of time to activate the first invisible ink in the information unit 810 and also to activate the second invisible ink in the information unit 815. Accordingly, as shown in FIG. 8C, the barcode in the information unit 810 has changed to a new color represented by the thicker lines. For example, the new color for the barcode in information unit 810 may be a dark green color. Similarly, the product description in the information unit 815 has changed to a new color represented by the different font. For example, the new text color for the product description in information unit 815 may be the same dark green color or may be a color that is different from the new color of the barcode in information unit 810.

Figure 9A:
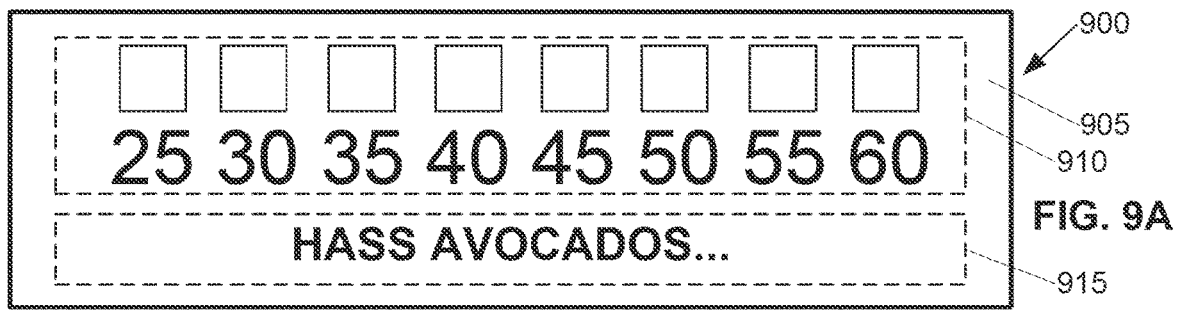
FIGS. 9A, 9B, 9C and 9D illustrate an example label in a supply chain management system dynamically changing, in response to environmental conditions, according to an aspect.

FIGS. 9A, 9B, 9C and 9D illustrate an example label 900 in a supply chain management system dynamically changing in response to environmental conditions, according to an aspect. As shown in FIG. 9A the label 900 includes information elements 910, and 915 positioned upon field 905. Information unit 915 includes a product description printed in durable black ink. Information unit 910 includes a series of temperature values (e.g., in Fahrenheit) and corresponding empty boxes printed in durable black ink. The inside portion of each of the empty boxes of information unit 910 is printed with a different invisible ink, where each different invisible ink is activated in accordance with different environmental conditions, e.g., a different temperature of the ambient environment for a predetermined amount of time, where each temperature and each time may be different. However, as shown in FIG. 9A, the invisible inks have not been activated so the information unit 910 includes only the durable black ink printed on the neutral white color of the field 905.

Figure 9B:

Turning to FIG. 9B, in this aspect, appropriate ideal environmental conditions were present (e.g., a certain ambient temperature for a predetermined amount of time or the presence of an ultraviolet light for a predetermined amount of time) to activate the invisible ink in only the 40 degree range temperature box of the information unit 910. Environmental conditions were not present to activate the invisible ink in the other temperature range boxes of the information unit 910. As can be understood, the presence of the visible ink in the single box may convey, e.g., to a machine vision processing system, an approximation of the minimum and maximum temperature (e.g., about 40 degrees) the product has been stored at within the supply chain. In one aspect, if the maximum temperature exceeds a predetermined threshold, e.g., 55 degrees Fahrenheit, the supply chain management system is configured to examine the supply chain history of the product to determine if the product should be removed from the supply chain.

Figure 9C:

Turning to FIG. 9C, in this aspect, environmental conditions were present (e.g., a certain ambient temperature for a predetermined amount of time or the presence of an ultraviolet light for a predetermined amount of time) to activate the invisible ink in the 40 degree, 35 degree, and 30 degree boxes of the information unit 910. Environmental conditions were not present to activate the invisible ink in the other temperature range boxes of the information unit 910. As can be understood, the presence of the visible ink in the 40 degree, 35 degree, and 30 degree boxes may convey, e.g., to a machine vision processing system, an approximation of the minimum and maximum temperatures the product has been stored at within the supply chain. As shown, because the minimum temperature appears to have exceeded the predetermined minimum threshold of 31 degrees Fahrenheit, the supply chain management system is configured to examine the supply chain history of the product (or box of product or pallet of product) to determine if the product should be removed from the supply chain.

Figure 9D:
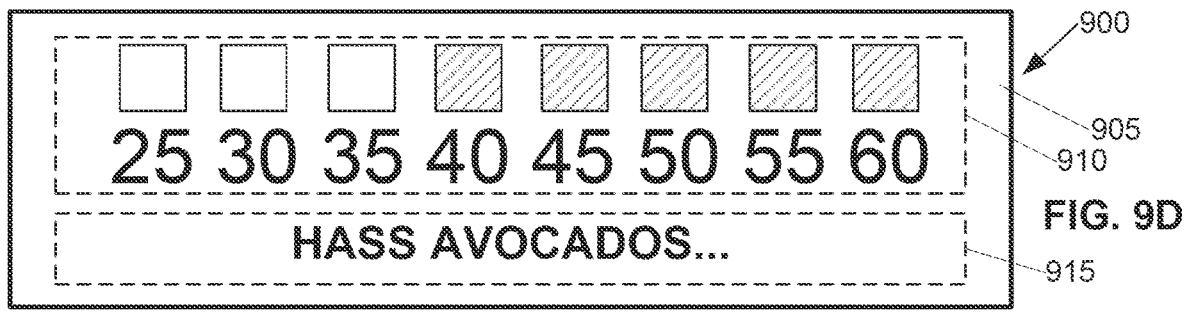

Turning to FIG. 9D, in this aspect, environmental conditions were present (e.g., a certain ambient temperature for a predetermined amount of time or the presence of an ultraviolet light for a predetermined amount of time) to activate the invisible ink in the 40 degree, 45 degree, 50 degree, 55 degree, and 60 degree boxes of the information unit 910. Environmental conditions were not present to activate the invisible ink in the other temperature range boxes of the information unit 910. As can be understood, the presence of the visible ink in the 40 degree, 45 degree, 50 degree, 55 degree, and 60 degree boxes may convey, e.g., to a machine vision processing system, an approximation of the minimum and maximum temperatures the product has been stored at within the supply chain. As shown, because the maximum temperature appears to have exceeded the predetermined maximum threshold of 55 degrees Fahrenheit, the supply chain management system is configured to examine the supply chain history of the product (or box of product or pallet of product) to determine if the product should be removed from the supply chain.

Figure 10A:
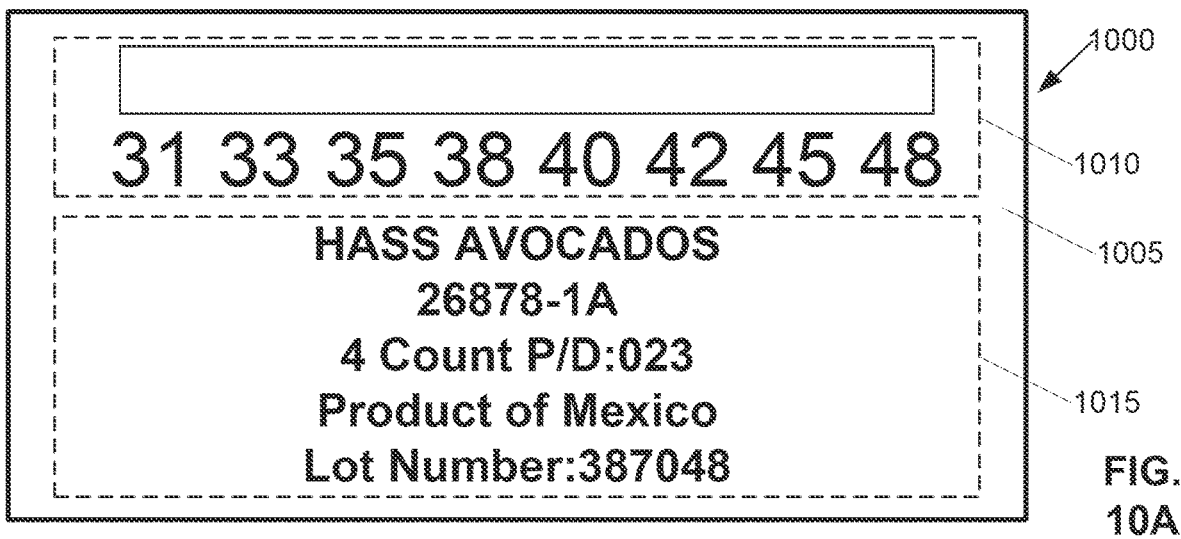
FIGS. 10A, 10B and 10C illustrate an example label in a supply chain management system dynamically changing, in response to environmental conditions, according to an aspect.
Figure 10B:
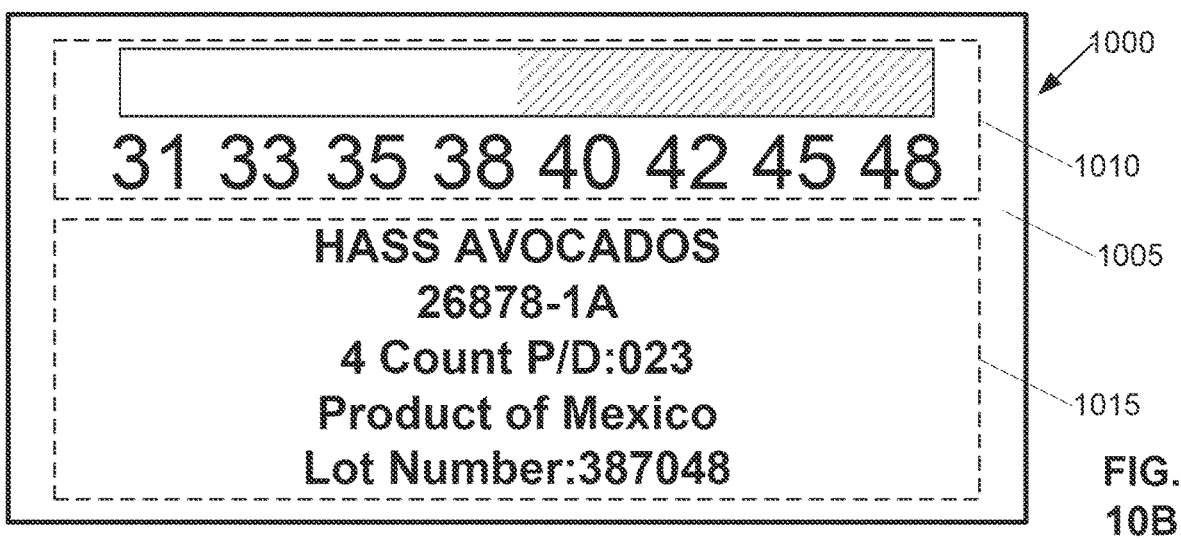
Figure 10C:
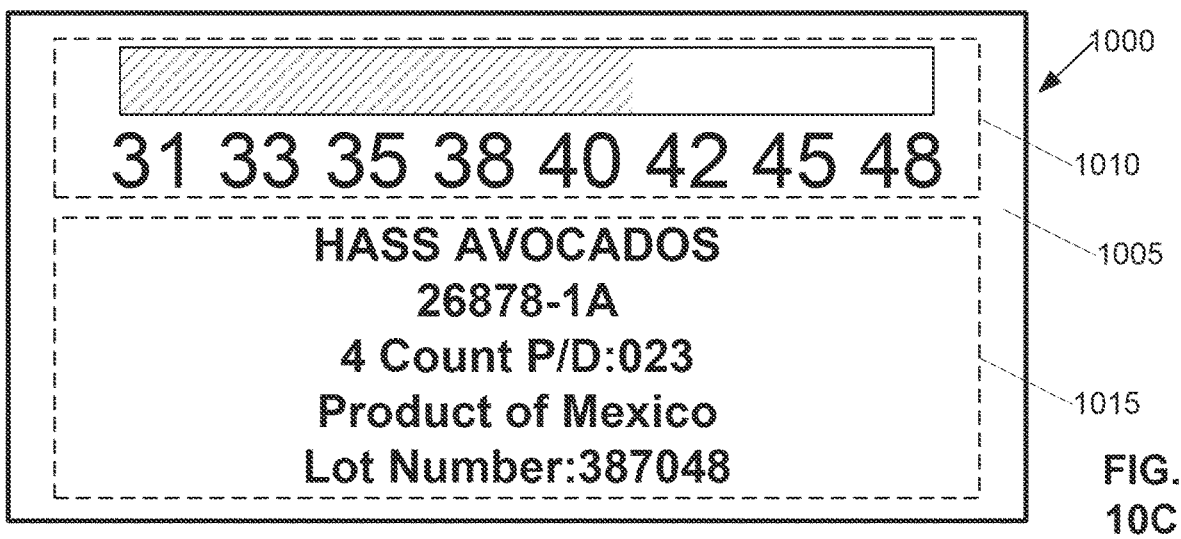

FIGS. 10A, 10B and 10C illustrate an example label 1000 in a supply chain management system dynamically changing in response to environmental conditions, according to an aspect. As shown in FIG. 10A the label 1000 includes information elements 1010, and 1015 positioned upon field 1005. Information unit 1015 includes a product description printed in durable black ink. Information unit 1010 includes a series of temperature values (e.g., in Fahrenheit) below a long rectangle. The temperature values and the long rectangle are printed in durable black ink. The inside portion of the long rectangle of information unit 1010 is printed with a plurality of different invisible inks, where each different invisible ink is activated in accordance with different environmental conditions, e.g., a different temperature of the ambient environment for a predetermined amount of time, where each temperature and each time may be different. Alternatively, the inside portion of the long rectangle of information unit 1010 may be printed with a variable invisible ink, where the amount of invisible ink that is activated (e.g., from left to right) varies in accordance with different environmental conditions, e.g., increasing temperatures of the ambient environment for a predetermined amount of time results in an increase (from left to right) of the amount of ink that becomes visible. However, as shown in FIG. 10A, the variable invisible ink has not been activated so the information unit 1010 includes only the durable black ink printed on the neutral white color of the field 1005.

Turning to FIG. 10B, in this aspect, environmental conditions were present (e.g., a certain ambient temperature for a predetermined amount of time or the presence of an ultraviolet light for a predetermined amount of time) to activate the invisible ink in a first portion of the long rectangle (represented by the hashing) of the information unit 1010 but not to activate the invisible ink in remaining portion of the long rectangle of the information unit 1010. As can be understood, the presence of the visible ink in the long rectangle may convey, e.g., to a machine vision processing system, an approximation of the minimum and maximum temperature (e.g., between 39 and 48 degrees) the product has been stored at within the supply chain. In one aspect, if the maximum temperature exceeds a predetermined threshold, e.g., 47 or 48 degrees Fahrenheit, the supply chain management system is configured to examine the supply chain history of the product to determine if the product should be removed from the supply chain.

Turning to FIG. 10C, in this aspect, environmental conditions were present (e.g., a certain ambient temperature for a predetermined amount of time or the presence of an ultraviolet light for a predetermined amount of time) to activate the invisible ink in a first portion of the long rectangle (represented by the hashing) of the information unit 1010 but not to activate the invisible ink in the remaining portion of the long rectangle of the information unit 1010. As can be understood, the presence of the visible ink in the first portion of the long rectangle may convey, e.g., to a machine vision processing system, an approximation of the minimum and maximum temperature (e.g., between 31 and 41 degrees) the product has been stored at within the supply chain. As shown, because the minimum temperature exceeds the predetermined minimum threshold of 32 degrees Fahrenheit, the supply chain management system is configured to examine the supply chain history of the product (or box of product or pallet of product) to determine if the product should be removed from the supply chain.

Figure 11:
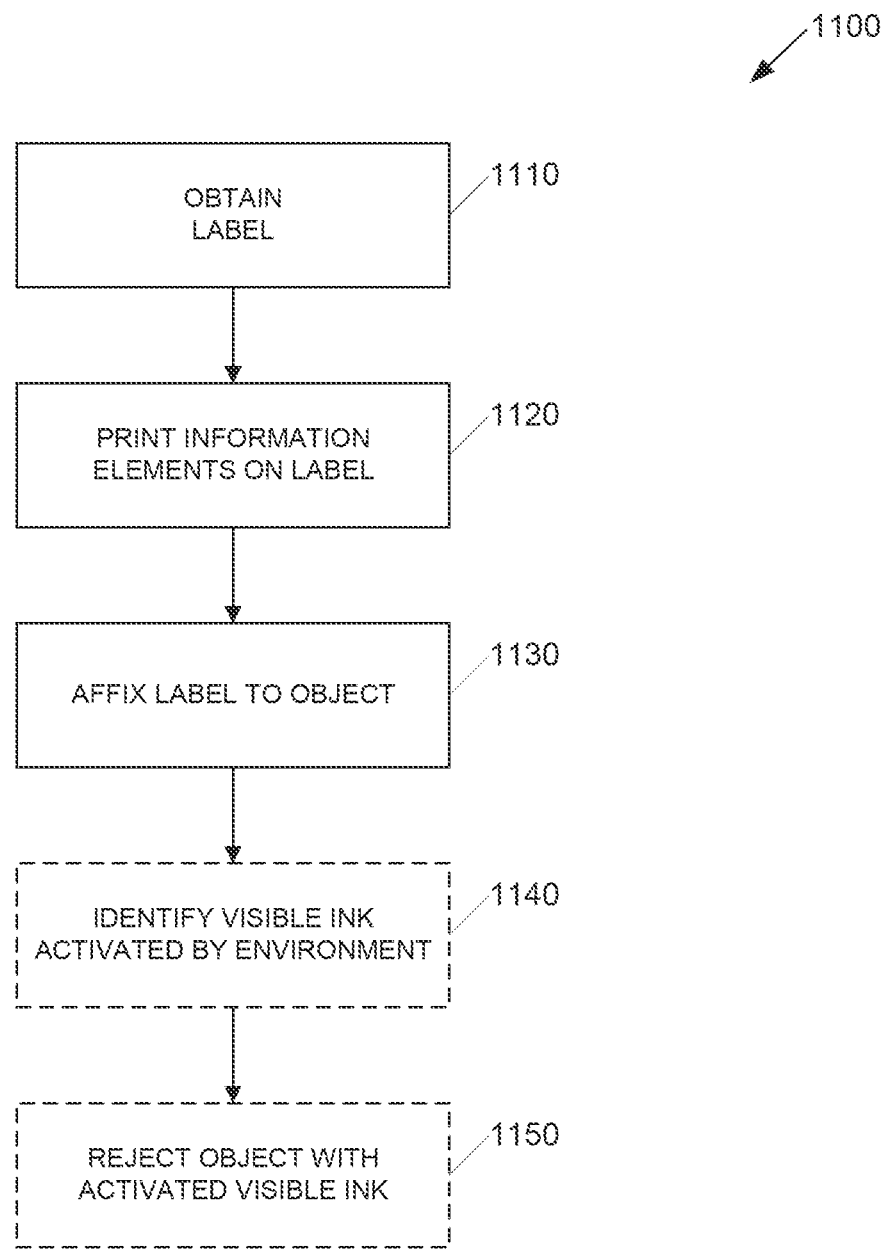
FIG. 11 illustrates an example process for supply chain management, according to an aspect.

FIG. 11 illustrates an example process 1100 for supply chain management, according to an aspect. The illustrated process may be carried out in connection with the supply chain management infrastructure, processing system, and computer processing system described in connection with FIGS. 1-3. Initially, a label is obtained at 1110. The label may be any of a variety of pre-printed and blank labels, for example any one of the labels previously described in connection with FIGS. 4-10C. The material used to form the label may be polyester, polypropylene, paper, polyethylene, polyethylene terephthalate, or other natural substances, processed substances, or plastics. In one aspect, the label has a first side and a second side and the first side is configured to affix the label to a first object. For example, the first side may have a glue or other adhesive applied to it or the first side may have one portion of a hook and loop fastener or a magnetic fastener or a tension fit (e.g., snap) fastener or the like.

Next, at 1120 one or more information elements are printed on the label. Preferably, the information elements are printed on the side of the label that does not include the adhesive/fastener. The information elements may be printed in a variety of types of ink include durable visible ink and ink that may change when exposed to certain environmental conditions. One example of an ink that may change when exposed to certain environmental conditions is an invisible ink that changes to become visible when exposed to ultraviolet light. Another example of an ink that may change when exposed to certain environmental conditions is a visible ink that changes from a first color to a second color when exposed to a temperature that exceeds 55 degrees Fahrenheit for over 45 minutes.

In one aspect, a plurality of information elements are printed on the label and these information elements include at least one first information element in a first ink that is a visible ink and at least one second information element in a second ink that is invisible until activated by environmental conditions.

In one aspect, the second ink is configured to be thermally activated when exposed to an environment having an ambient temperature that exceeds a predetermined threshold in the range of 42 degrees to 60 degrees.

In one aspect, the label has information elements printed thereon that comprise visible ink, ink that is thermally activated, and ink that is configured to be activated when exposed to an ultraviolet light. In another aspect, the information elements include at least one bar code and one price look up code.

At 1130, the label is affixed to an object. One example of an object would be a product. One example of a product would be a perishable item such as an avocado or other type of fruit or vegetable. Another example of an object would be a pallet supporting a plurality of perishable products or a container holding a plurality of perishable products. Another example of an object would be a film, for example a film used to wrap a collection of products or objects. Accordingly, at 1130, the label may be affixed directly to the object or to a pallet or container or wrapping associated with the object.

After the label has been affixed to the object, the object travels through the supply chain management infrastructure and is processed at various waypoints by various processing stations. These processing stations may include scanning and imaging stations that are configured to analyze the label affixed to the object and during such analysis, as shown at 1140, an information element on the label in visible ink may be identified as visible ink that has been activated by environmental conditions. In one aspect, the activation is based on exposure to an environment for a time period that exceeds a predetermined time period of 1 minute to 60 minutes. The activation of the visible ink may include changing invisible ink to visible ink or it may include changing visible ink from a first color to a second color.

In an aspect, if visible ink activated by the environment is identified at 1140, a quality review is conducted for the object or a collection of objects related to the object to determine if the object or collection of objects remains suitable for its original purpose. Accordingly, upon conclusion of the quality review, the object or collection of objects may continue through the supply chain as originally intended or the object or collection of objects may be rerouted through the supply chain for a newly identified purpose.

At 1150, upon identifying the information element with the visible ink that has been activated by environmental conditions, the object to which the label has been applied is rejected. For example, the ink of the information element may have been originally printed in a first color and then the ink of the information element changed to a second color because the object was exposed to an environment with an ambient temperature of 55 degrees Fahrenheit or more for a period of time exceeding a predetermined threshold (e.g., 45 minutes). In such a scenario, the change in color of the ink of the information element signals that the object was subjected to a cold chain break and consequently the object is rejected. In one aspect, when an object is rejected it may be disposed of. In an alternative aspect, when an object is rejected it may be rerouted through the supply chain for a newly identified purpose.

Figure 12:
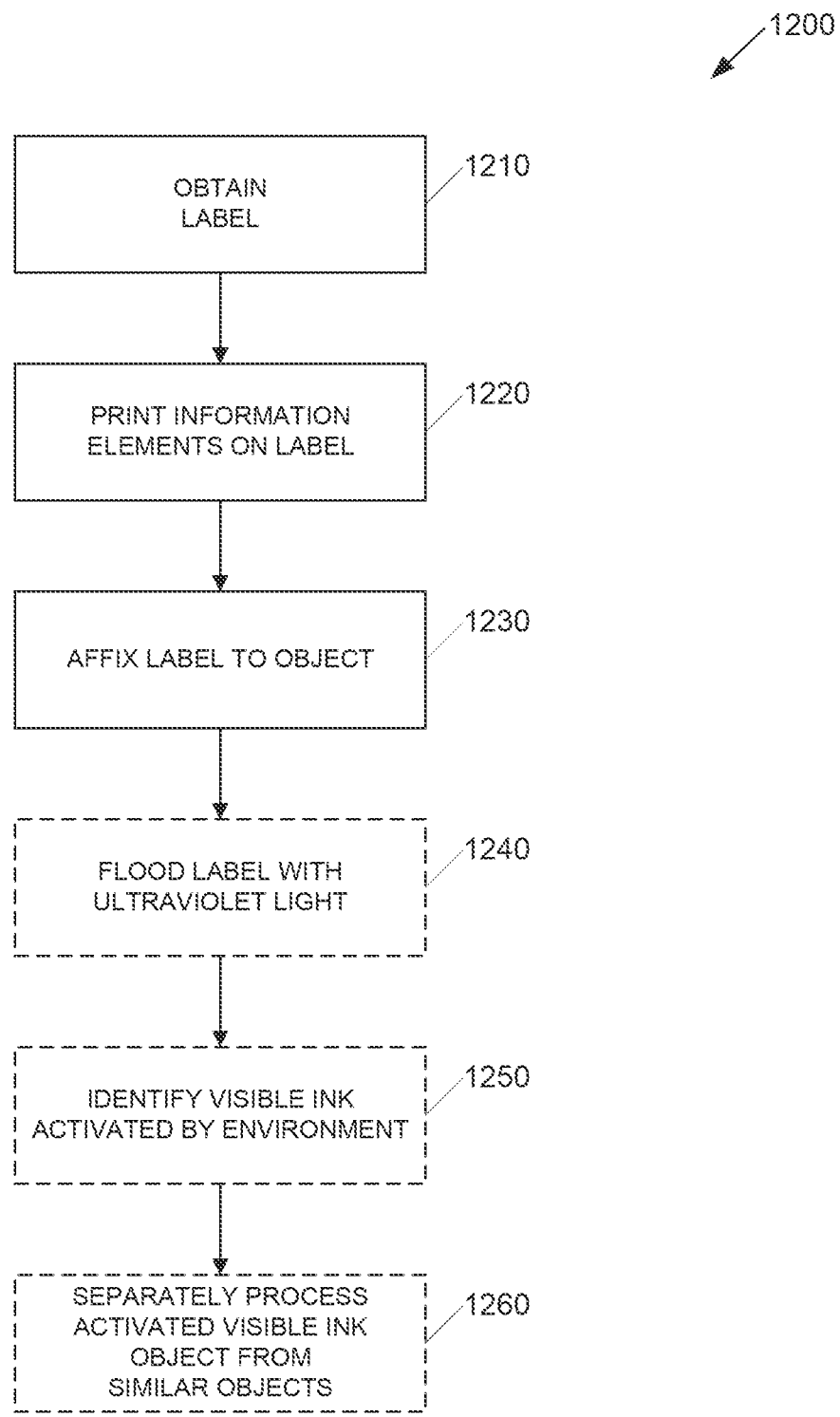
FIG. 12 illustrates an example process for supply chain management, according to an aspect.

FIG. 12 illustrates an example process 1200 for supply chain management, according to an aspect. The illustrated process may be carried out in connection with the supply chain management infrastructure, processing system, and computer processing system described in connection with FIGS. 1-3. Initially, at 1210, a label having a first side and a second side is obtained, where the first side is configured to affix the label to a first object. Next, at 1220, a plurality of information elements are printed on the second side of the label and at 1230 the label is affixed to the first object. The plurality of information elements include at least one first information element in a first ink that is visible and the plurality of information elements include at least one second information element in a second ink that is invisible until activated by environmental conditions. The process in 1210, 1220, and 1230 is similar to the process previously described with respect to 1110, 1120, and 1130, so that description will not be repeated here.

In one aspect, the second ink is configured to be activated when exposed to an ultraviolet light and at 1240, the second ink is activated by by flooding the label affixed to the first object with an ultraviolet light. This can be done, for example, at an illumination station such as previously described with respect to FIG. 2.

At 1250, the visible second ink is identified on the label applied to the first object. This identification may be accomplished via scanning and/or imaging the label applied to the first object and analyzing the resulting image data to identify the visible second ink. This can be done, for example, at a scanning station or imaging station such as previously described with respect to FIG. 2.

At 1260, the first object having the label with the visible second ink is processed separately from similar objects not having visible second ink on their respective labels. For example, the first object having the label with the visible second ink may be packaged separately from similar objects not having visible second ink on their respective labels. In one example, the visible second ink confirms that a protective coating has been applied to the object and the absence of the visible second ink confirms that the protective coating has not been applied to the object. Accordingly, the objects with the protective coating are packaged and sold together, e.g., at a higher price, and the objects without the protective coating are packaged and sold together, e.g., at a lower price.

Figure 13:
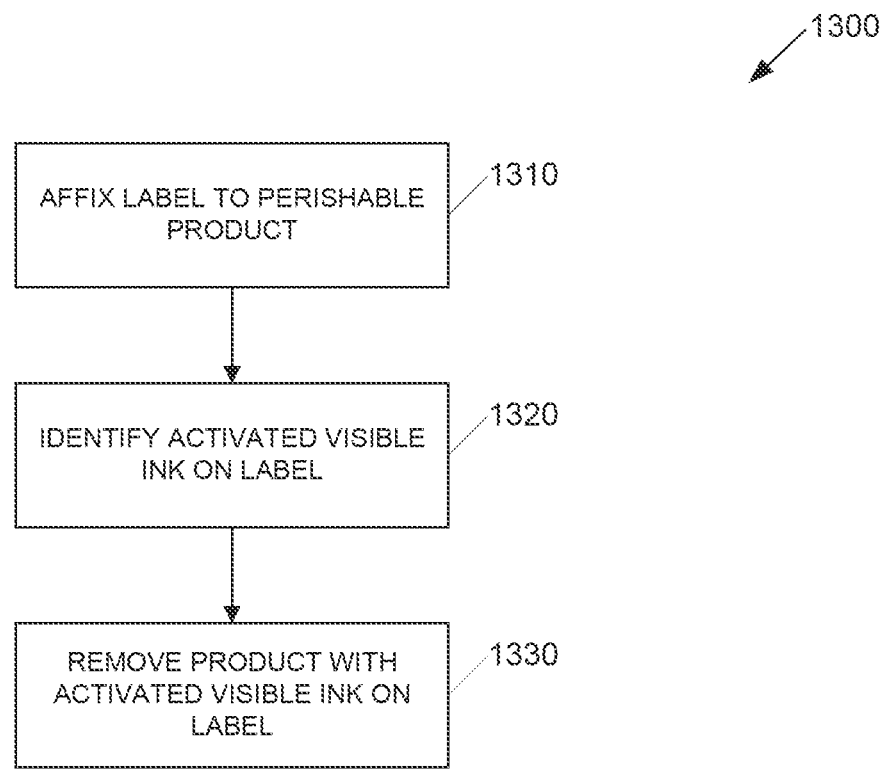
FIG. 13 illustrates an example process for supply chain management, according to an aspect.

FIG. 13 illustrates an example process 1300 for supply chain management, according to an aspect. The illustrated process may be carried out in connection with the supply chain management infrastructure, processing system, and computer processing system described in connection with FIGS. 1-3. Initially, at 1310, a first label is affixed to a first perishable product at a first waypoint in a supply chain, the first label having at least one first information element in a visible ink and at least one second information element in an invisible ink. The label may be applied directly to a single perishable object or to a container holding plural perishable objects or to a pallet supporting plural perishable objects or plural containers holding plural perishable objects or to a film or wrapping of a single perishable object or plural perishable objects or the like.

Next, at 1320, the first label on the first perishable product is analyzed at a second waypoint in the supply chain to identify at least one second information element on the first label that has been activated by environmental conditions to become visible. Such activation might be triggered, for example, by a cold chain break where the perishable product was subjected to an environment having an ambient temperature over 55 degrees Fahrenheit for more than 45 minutes. Alternatively, such activation might be triggered, for example, by a cold chain break where the perishable product was subjected to an environment having an ambient temperature under 31 degrees Fahrenheit for more than 45 minutes.

The analysis may be accomplished via scanning and/or imaging the first label applied to the first perishable product and analyzing image data corresponding to the first perishable product to identify the at least one second information element on the first label that has been activated by environmental conditions to become visible. This analysis and identification can be done, for example, at a scanning station or imaging station such as previously described with respect to FIG. 2.

Next, at 1330, the first perishable product is removed from the supply chain in response to identifying the at least one second information element on the first label that has been activated by environmental conditions to become visible. Advantageously, this allows individual perishable objects and/or containers and/or packages and/or pallets of perishable objects that have been exposed to adverse environmental conditions in the supply chain to be automatically identified and removed from the supply chain.

In one aspect, the invisible ink may be activated by environmental conditions and become visible ink at a temperature that exceeds a predetermined threshold in the range of 42 degrees to 60 degrees. In another aspect, the invisible ink may be activated by environmental conditions and become visible ink when exposed to an ultraviolet light.

Figure 14:
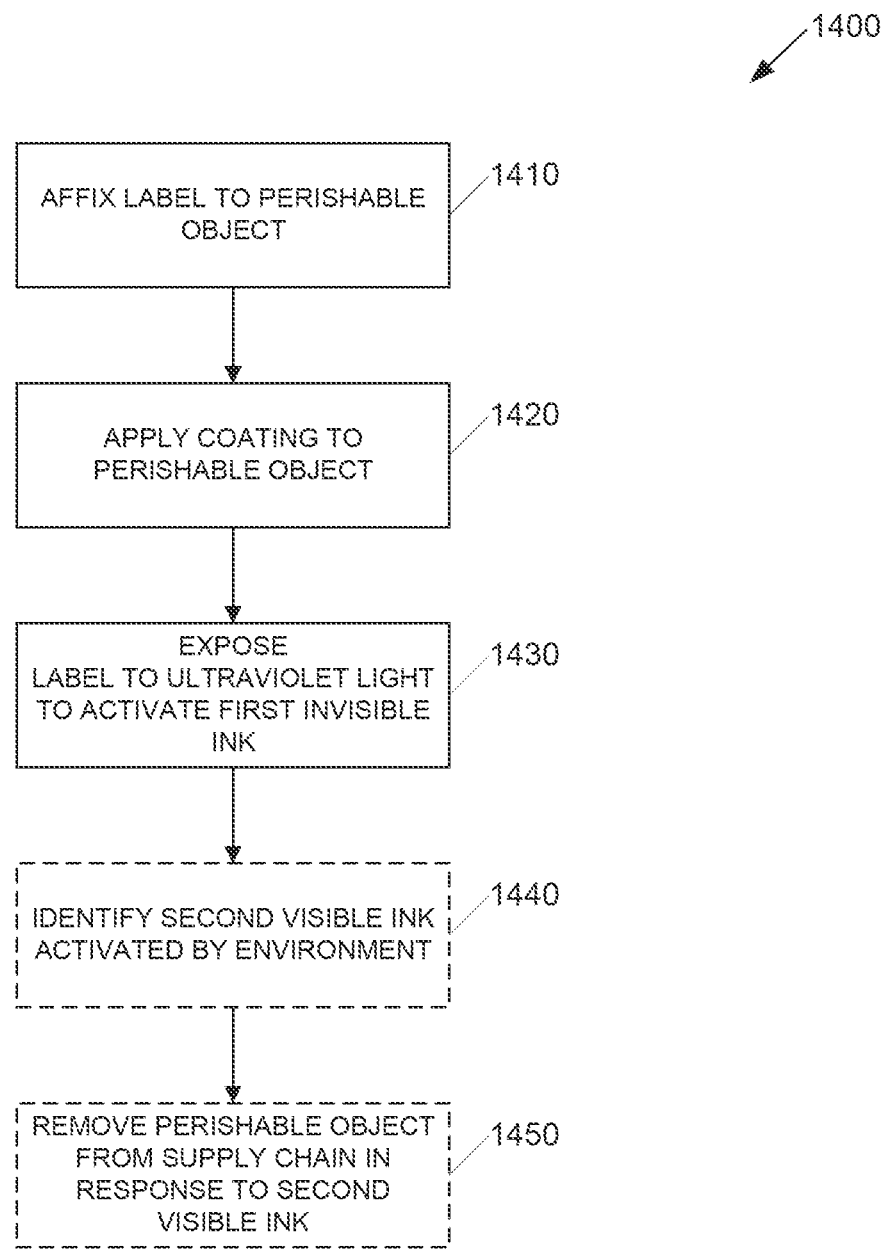
FIG. 14 illustrates an example process for supply chain management, according to an aspect.

FIG. 14 illustrates an example process 1400 for supply chain management, according to an aspect. The illustrated process may be carried out in connection with the supply chain management infrastructure, processing system, and computer processing system described in connection with FIGS. 1-3. Initially, at 1410, a label is affixed to a perishable object. For example, the label may comprise a plurality of information elements including at least one first information element in a first ink that is visible and at least one second information element in a second ink that is invisible until activated by environmental conditions.

Next, at 1420 the perishable object is processed to apply a coating to at least a portion of the surface of the perishable object. In one aspect, the coating may be a protective coating that is sprayed onto the surface of the perishable object.

Next, at 1430, the perishable object is processed to expose the label to an ultraviolet light having a wavelength configured to activate the second ink and turn the at least one second information element visible. Advantageously, at least one of the second information elements can be an indicator that the protective coating has been applied to the perishable object. In one aspect, the coating may be applied at a treatment station such as previously described with respect to FIG. 2 and the ultraviolet light may be applied at an illumination station such as previously described with respect to FIG. 2.

Next, at 1440 when the second visible ink is identified on a perishable product at a waypoint in the supply chain, then at 1450 the perishable product is removed from the supply chain. This advantageously allows individual perishable products or containers full of perishable products or pallets supporting containers full of perishable products to be easily identified using scanning machines and imaging machines such that these perishable products can be removed from the supply chain so that the quality of such removed perishable products may be validated before delivery.

In one aspect, the perishable object is a fruit or a vegetable and the coating is edible. For example, the perishable object may be an avocado with an edible coating that is applied to it.

In another aspect, the label may comprise at least one third information element in a third ink, wherein the third ink is invisible until thermally activated by environmental conditions. In this aspect, the perishable object can be processed to determine that the at least one third information element in invisible ink has been thermally activated and transformed into visible ink. Such perishable products with thermally activated ink on their labels can be identified and removed from the supply chain, for example because an ambient temperature around the label has exceeded a predetermined threshold. For example, the predetermined threshold may be in the range of 42 degrees to 60 degrees and in one instance the predetermined threshold may be 55 degrees Fahrenheit.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A supply chain management method comprising:
   at a first waypoint in a supply chain, receiving a first perishable product having a first label affixed to a surface of the first perishable product, the first label having at least one first information element in a visible ink and at least one second information element in a first invisible ink and at least one third information element in a second invisible ink, wherein the first invisible ink and the second invisible ink are configured to be activated by environmental conditions to become visible;
   at a second waypoint in the supply chain, applying a coating to at least a portion of the surface of the first perishable object;
   at the second waypoint in the supply chain, exposing the first label to an ultraviolet light having a wavelength configured to activate the first invisible ink to become visible, wherein the second information element is an indicator that the protective coating has been applied to the first perishable object;
   at a third waypoint in the supply chain, analyzing the first label on the first perishable product to identify at least one third information element on the first label where the second invisible ink has been activated by environmental conditions to become visible; and
   at the third waypoint in the supply chain, in response to identifying the at least one third information element on the first label where the second invisible ink has been activated by environmental conditions to become visible, rerouting the first perishable object through the supply chain.

2. The method of claim 1, wherein the second invisible ink is configured to be thermally activated when exposed to an environment having an ambient temperature that exceeds a predetermined threshold in the range of 42 degrees to 60 degrees.

3. The system of claim 2, wherein the predetermined threshold is 55 degrees Fahrenheit and wherein the exposure to the environment is for a time period that exceeds 45 minutes.

4. The method of claim 1, wherein rerouting comprises
processing the first perishable product having the first label with the visible first invisible ink separately from similar perishable products not having visible first invisible ink on their respective labels.

5. The method of claim 1, wherein the second invisible ink is configured to be thermally activated.

6. The method of claim 1, wherein the at least one first information element includes a bar code and a price look up code in the visible ink and wherein the first perishable product comprises a plurality of perishable products supported on a pallet.

7. The method of claim 1, wherein the at least one first information element includes a bar code and a price look up code in the visible ink and wherein the first perishable product comprises a plurality of perishable products held by a container.

8. A supply chain management method comprising:
affixing a label to a perishable object, the label comprising a plurality of information elements including at least one first information element in a first ink, wherein the first ink is visible and at least one second information element in a second ink, wherein the second ink is invisible until activated by environmental conditions;
processing the perishable object to apply a coating to at least a portion of the surface of the perishable object;
processing the perishable object to expose the label to an ultraviolet light having a wavelength configured to activate the second ink and turn the at least one second information element visible, wherein at least one of the second information element is an indicator that the protective coating has been applied to the perishable object.

9. The supply chain management method of claim 8, wherein the perishable object is one of a fruit or vegetable and wherein the coating is an edible coating.

10. The supply chain management method of claim 8, wherein the perishable object is an avocado and wherein the coating is an edible coating.

11. The supply chain management method of claim 8, wherein the label comprises at least one third information element in a third ink, wherein the third ink is invisible until activated by environmental conditions, further comprising:
processing the perishable object to determine that the at least one third information element in invisible ink has been activated and transformed into visible ink; and
removing the perishable product from the supply chain in response to determining that the at least one third information element in invisible ink has been activated.

12. The supply chain management method of claim 11, wherein the third ink is thermally activated when an ambient temperature around the label exceeds a predetermined threshold in the range of 42 degrees to 60 degrees.

13. The supply chain management method of claim 12, wherein the predetermined threshold is 55 degrees Fahrenheit and wherein the exposure to the environment is for a time period that exceeds 45 minutes.

* * * * *